United States Patent [19]
Kinose et al.

[11] Patent Number: 5,205,471
[45] Date of Patent: Apr. 27, 1993

[54] METHOD AND APPARATUS FOR JOINING STEEL PIECES IN A HOT ROLLING MILL

[75] Inventors: Ryohei Kinose; Yasutsugu Yoshimura, both of Hitachi; Teruo Sekiya, Takahagi, all of Japan

[73] Assignee: Hitachi, Ltd., Tokyo, Japan

[21] Appl. No.: 848,083

[22] Filed: Mar. 9, 1992

[30] Foreign Application Priority Data

Mar. 20, 1991 [JP] Japan ................................ 3-57033

[51] Int. Cl.⁵ .................... B23K 7/00; B23K 20/00; B22D 11/00; B22D 11/12
[52] U.S. Cl. .................................. 228/265; 228/176; 228/5.7; 228/45; 228/178; 164/476; 164/477; 29/527.7
[58] Field of Search ............. 228/170, 176, 178, 242, 228/265, 5.7, 32, 45, 902; 164/476, 477; 29/527.6, 527.7

[56] References Cited

U.S. PATENT DOCUMENTS

| | | | |
|---|---|---|---|
| 4,294,394 | 10/1981 | Iida et al. | 228/5.7 |
| 4,552,299 | 11/1985 | Sendzimir | 228/5.7 |
| 4,706,871 | 11/1987 | Kajiwara et al. | 228/5.7 |
| 5,121,873 | 6/1992 | Sekiya et al. | 228/176 |

FOREIGN PATENT DOCUMENTS

| | | |
|---|---|---|
| 60-170581 | 9/1985 | Japan . |
| 61-253178 | 11/1986 | Japan . |
| 62-127185 | 6/1987 | Japan . |
| 62-234679 | 10/1987 | Japan . |

*Primary Examiner*—Samuel M. Heinrich
*Attorney, Agent, or Firm*—Evenson, McKeown, Edwards & Lenahan

[57] ABSTRACT

Methods and apparatus for joining conveyed steel pieces in a hot rolling mill are disclosed. A joining apparatus having a series of fusing torches extending laterally across the steel path is used, either before a rough rolling stage or between rough rolling and finish rolling. The fusing torches which operate at the side edges of the pieces to be joined are controlled to have independent movement by a controller, in such a way that the time elapsing between fusing and pressing together of portions at the lateral edges of the join line does not exceed a critical time for regrowth of oxide scale. Various mounting and control techniques for the fusing torches are proposed, including the possibility of two independently-driveable sets the controller can base its control of the torches on steel strip width information obtained from the processing path.

25 Claims, 10 Drawing Sheets a.

b.

c.

d.

a.

b.

c.

d.

a.

b.

c.

d.

a.

b.

c.

d.

METHOD AND APPARATUS FOR JOINING STEEL PIECES IN A HOT ROLLING MILL

FIELD OF THE INVENTION

This invention relates to methods and apparatus for joining steel pieces in a hot rolling mill.

1. Background of the Invention

A hot rolling mill e.g. a hot steel strip rolling machine, is well known. A typical known machine has a continuous casting unit, a heating furnace, a rough rolling stage and a finish rolling stage. Hot rolled steel slab made by the continuous casting unit is converted to the product by heating in the furnace followed by hot rolling in the rough and finish rolling stages. Because the steel is processed as slabs in the heating process, it is generally rolled with certain intervals between the successive slabs or pieces.

Recently, continuous rolling has been proposed. Continuous rolling involves joining together the steel slabs or pieces, either before they are rolled or during the rolling process. The achievement of commercial continuous rolling is expected to enable large savings in energy and labour, improvement in yield and improved productivity.

Because of the high speeds, high temperatures and large forces involved in the rolling of steel, it is difficult to achieve continuous rolling. Prior art documents contain a number of proposals.

2. Discussion of the Prior Art

JP-A-60/170581 and JP-A-62/234679 both describe joining successive steel pieces together by fusing their adjacent faces using high frequency induction heating.

JP-A-61/253178 describes fusing the adjacent faces by generating an arc using DC current.

JP-A-62/127185 describes fusing overlapping surfaces to be jointed while blowing oxide scale from the surfaces using a jet of iron powder in oxygen gas.

Despite these prior disclosures, continuous rolling technology has not yet been commercially realised. We believe that this is because the following three conditions have not yet been adequately fulfilled: (1) the end surfaces of the steel pieces must be raised to at least 1500° C.; (2) oxide scale on the surfaces to be joined must not exceed a certain limit, and (3) the faces to be joined must be substantially flat.

Of the above-mentioned publications, JP-A-62/127185 does give importance to removing oxide scale. However the use of only oxygen gas against the surfaces results in insufficient heating. The other methods, using high frequency induction heating and melting by arcs, tend to be incapable of heating to the centre of a surface to be jointed. Furthermore, they suffer with a problem of oxide scale.

The prior technology does not consider point (3) at all. The end faces of rolled steel pieces are usually sheared by a drum shearing machine, giving sheared faces which are straight neither in width or thickness. Even with adequate heating, such faces will be jointed only at random spot locations, rendering the joint liable to breakdown under the high tensions existing in the material during rolling. A large longitudinal compression can be used to avoid such random point-joining, but this is liable to cause swelling or bending of the steel out of alignment, with subsequent problems.

In an earlier-filed copending application we described joining rolled steel pieces by using a lateral series of fusing torches to melt-cut the ends of the steel pieces. The fusing torches may be moved laterally for the melt-cutting, to create a flat melted surface suitable for joining. The pieces may be pressed together during or after the melt-cutting.

SUMMARY OF THE INVENTION

It is an object of the present invention to provide novel methods and apparatus for joining steel pieces in a hot rolling process. In particular, it is a preferred object to solve the above-mentioned three problems existing in the prior art. It is also sought to address certain objects not addressed in our earlier application.

The present inventors have devoted further work and thought to the problem of oxide scale. They have found that it is not sufficient merely to remove oxide scale, as has been suggested in the prior art. It is also necessary to take care that oxide scale does not re-form in the time between fusing of the steel and joining of the two pieces. If oxide scale does reform above a certain degree, integrity of the joint is threatened. However, the inventors have made the discovery that, provided that the joint is well made at the lateral extremities of the joint between the two pieces, it may keep its integrity despite discontinuities elsewhere along the joint. Conversely, poor joining due e.g. to oxide scale regrowth, at the lateral extremities of the joint is an important contribution to weakness in the joint in the subsequent procedure, particularly in the finish rolling.

Based on this new understanding, we propose the following new method and apparatus aspects in which it is ensured, or made possible to ensure, that the time elapsing between the fusing of steel at the lateral extremities of the joint line, and the pressing together of the steel pieces, is not greater than a predetermined critical time $t_c$ for reformation of oxide scale. This is achieved using a technique in which a multiplicity of fusing torches are moved laterally along the adjacent ends of the two steel pieces to be joined, preferably with a small gap between those two pieces, in a fusing movement to cause at least partial fusing therealong, following which the two pieces are pressed together longitudinally to form the joint.

In one aspect, we provide a method of joining consecutive pieces of steel being processed in a hot rolling mill, in which multiple fusing torches are moved laterally in a fusing movement at the meeting between the adjacent ends of the pieces to cause fusing at at least one said end, and the pieces are then pressed together longitudinally to join them, characterised by controlling the lateral fusing movement made by various of the torches, on the basis of determined lateral locations of the steel, so that at the lateral extremities of the joint the time from fusing of the steel to said pressing together of the pieces is kept below a limit time for regrowth of oxide scale.

In another aspect, we provide apparatus for joining consecutive pieces of steel in a hot rolling mill, comprising multiple fusing torches to be disposed laterally across a processing path of the hot rolling mill;

means for driving said torches laterally in a fusing movement, to fuse end edges of steel pieces on the processing path in use;

means for determining the lateral locations of steel pieces on the processing path, and control means connected to said driving means and said location determining means, for controlling the driving means to effect independent adjustment of the respective fusing movements made by various of said fusing torches operable at or towards the two sides of the processing path, and means for pushing together, longitudinally, consecutive steel pieces on the processing path.

Control of the maximum time which passes between fusing and pressing together of the lateral extremities of the joint may be achieved in a number of ways. It is possible to adjust the relationship between the predetermined termination position of a fusing torch at the end of its fusing movement, relative to the side edge of the steel piece. It is possible to adjust the relationship between the side edge of a steel piece and a position where a fusing torch will begin its fusing movement. The fusing torches which fuse the two opposite side edges of the steel may perform their fusing movement in the same lateral direction. They may also perform their fusing movement at the same lateral speed. Indeed, in one preferred embodiment all of the fusing torches pass laterally at the same speed, in the same direction, for the fusing movement.

In another possibility, the respective lateral speeds in their fusing movements, of the fusing torches which fuse at the two lateral extremities of the joint are adjusted in dependence on the determined or regulated lateral situation of those edges.

Detection means may be provided, preferably both upstream and downstream of the joining location, to determine the positions of the side edges of the pieces to be joined. Additionally or alternatively, at least one side guide may be employed to determine the width centre of a steel piece. Preferably side guides are provided for both the preceding and the following steel pieces.

Either of such side guides and detection means is operatively connected to a suitable controller, so that the signal therefrom can be used by the controller in determining control signals which are output to the drive or drives controlling the fusing torches.

To achieve the variable fusing movement among the fusing torches which is generally required for the present invention, the fusing torches are preferably distributed among a plurality of sets. Each set will comprise at least one, but more usually at least three fusing torches joined together to move together as a unit. In particular, those fusing torches which are employed at or adjacent the respective lateral extremities of the steel pieces are desirably sub-divided into two such sets, having some necessary independence of control as mentioned above. For simplicity, it is possible to divide the entire series of fusing torches into just two sets, one set for each side of the processing path. Each set conveniently comprises a unitary mounting, such as a bracket or the like, for holding all of the fusing torches of that set.

Two sets may be mechanically separate, and rely on the control of separate drive systems to co-ordinate their effects. In another version, two such sets may be connected by an adjustable connector which itself is controllable. Adjustment of the connector may be used to adjust the spacing between the sets e.g. before a fusing movement is made. During the fusing movement, the two connected sets may then move together as one with the same velocity.

Other aspects of the invention, as set out in the claims, relate to those combinations of method and apparatus disclosed herein which are characteristic of the present concept, that is, they enable the independent adjustment of fusing at the lateral join extremities.

In other aspects, this invention provides a general method of processing steel in which steel pieces are formed, rough rolled and finish rolled, with consecutive pieces being joined by a method as described above, or using apparatus as described above, either before the rough rolling or between the rough rolling and the finish rolling.

Similarly, in a further aspect we provide a hot rolling mill comprising joining apparatus according to any of the aspects disclosed above. The joining apparatus may be before the rough rolling apparatus e.g. just after a heating furnace, or it may be between the rough rolling apparatus and the finish rolling apparatus.

The present inventors have clarified that the limit time "$t_c$" for regrowth of oxide scale is generally from 5 to 10 seconds for ordinary hot rolled steel. As mentioned above, it is not always necessary to join together the steel pieces continuously over their entire width. But, we find that a reliable joint can be formed provided that the joint is complete at the side edges thereof i.e. at the ends of the join line.

This condition can be ensured, even if the widths and alignments of consecutive steel pieces vary, using appropriate detection or guide means connected to a controller for the fusing torches. If one piece is narrower than the other, then the edges of that piece will determine the extremities of the joint line; a controller device may be programmed to recognise this situation and drive the torches accordingly. Other situations can be dealt with in a corresponding way. Side guides enable the setting of an appropriate fusing movement start position, even when a steel piece deviates from the centre of the processing path Principles relating to the invention are now discussed in more detail, and specific embodiments are described.

DETAILED DESCRIPTION OF PREFERRED EMBODIMENTS

Figure 2:
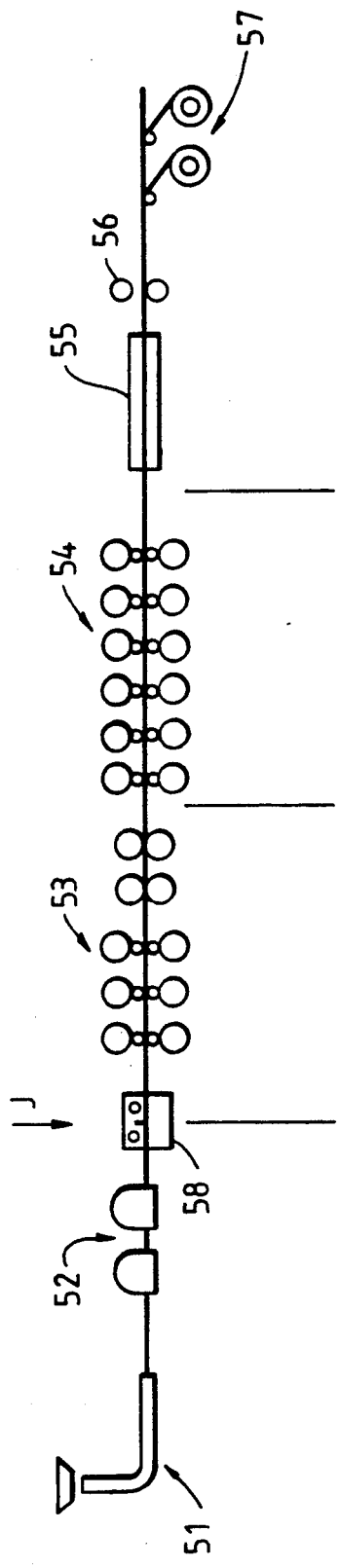
FIGS. 2 is a schematic side view showing stages of a hot steel strip rolling machine in one embodiment.
Figure 3:
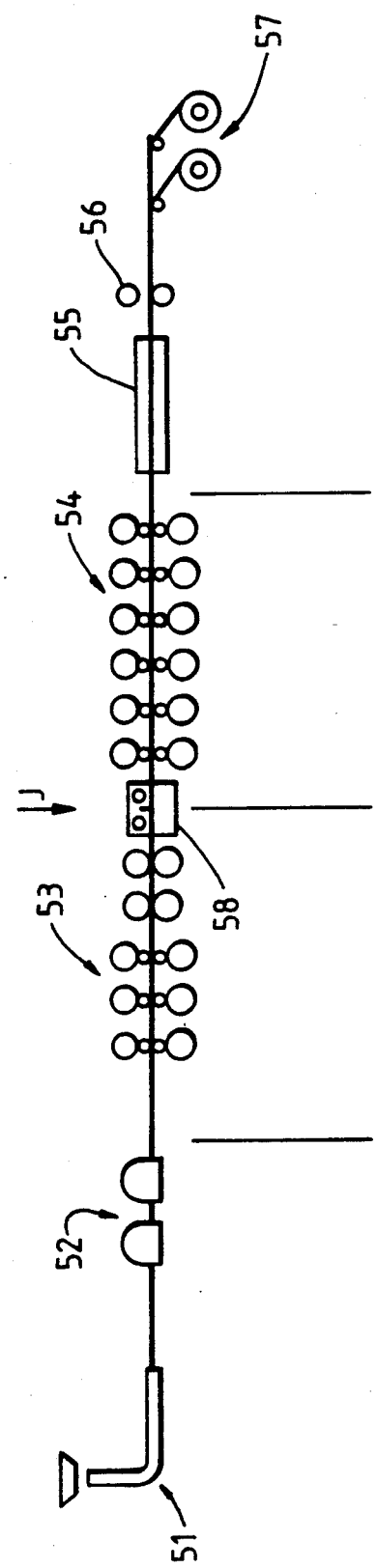
FIGS. 3 is a view similar to FIG. 2, showing a different embodiment.

FIGS. 2 and 3 show the general features of a typical hot steel strip rolling plant. This comprises, sequentially, a continuous casting machine 51, a heating furnace 52, a rough rolling stage 53 comprising a plurality of stands, a finish rolling stage 54 also comprising a plurality of stands, a cooling furnace 55, shearing machine 56 and winding machine 57. Apparatus 58 for joining together successive steel pieces may be positioned, as shown by arrow J, either between the heating furnace 52 and rough rolling stage 53 (FIG. 2) i.e. joining together slab pieces after heating, or between the rough rolling and finish rolling stages 53,54 (FIG. 3) i.e. joining together bar pieces after rough rolling and before finish rolling. For joining together slabs (FIG. 2), it is normally preferred to move the joining apparatus 58 along the processing path with the slabs as joining is done. It is possible to use a similar procedure when joining bars. However it is more preferred to use a looper (this is known to the skilled man) to absorb mismatch of the travelling speeds and preceding and subsequent rolled steel pieces, because the speed of these pieces is fast. If a looper is used, rolled steel pieces can be joined at a lowered speed or even when stopped.

Figure 1:
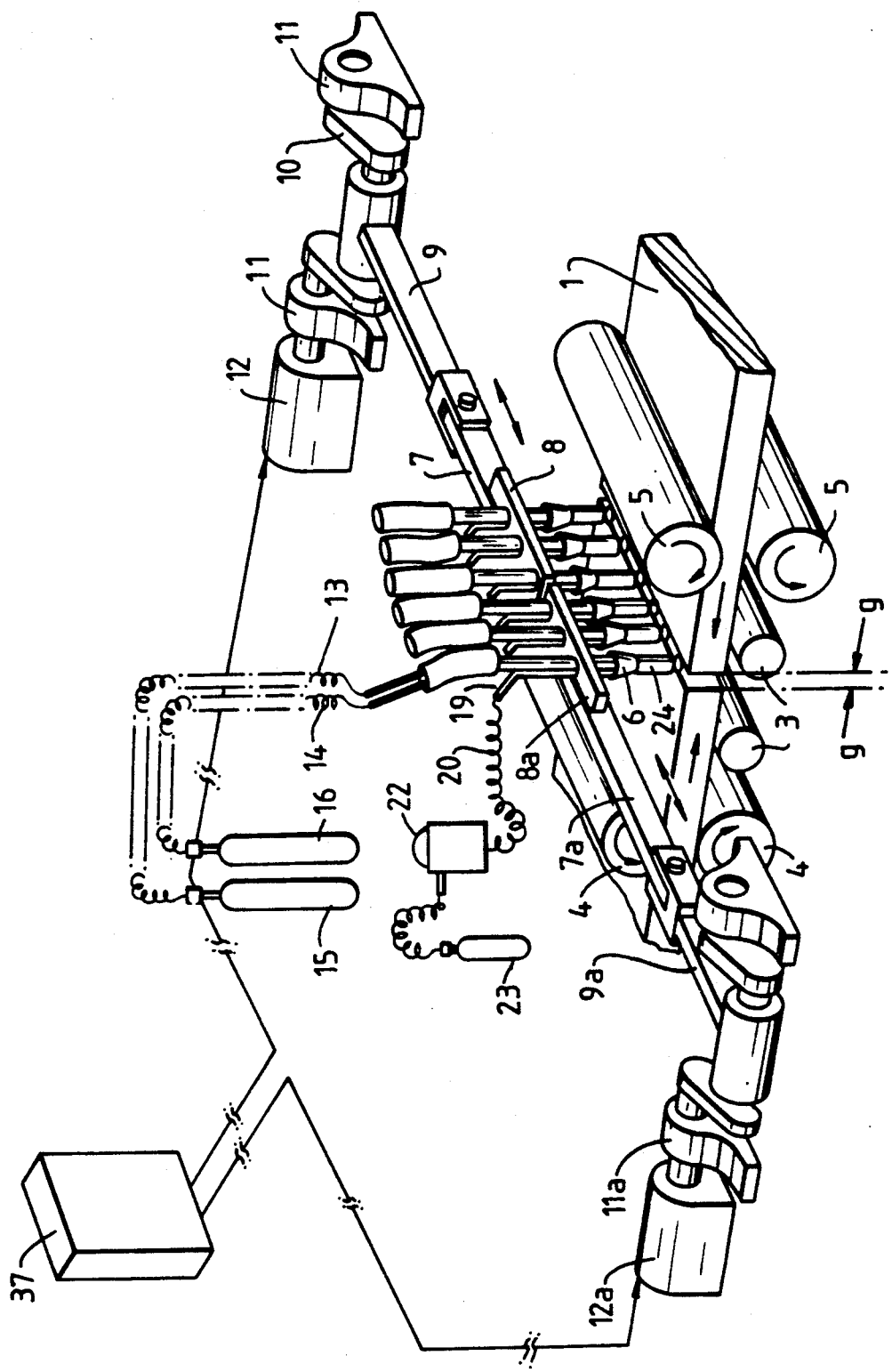
FIG. 1 is a perspective schematic view showing elements of a first joining apparatus embodying the invention.

A joining apparatus of an embodiment of this invention is explained according to FIGS. 1 and 4 to 6. Referring to FIG. 1, 1 is a preceding rolled steel piece and 2 is a following rolled steel piece. The preceding and following pieces 1 and 2 are transferred while supported by a table roller 3 and stopped at a desired position. Two pairs of pinch rollers 4 and 5 are arranged just near the rear end of a preceding rolled steel and front end of a following rolled steel. The pinch rollers 4 and 5 have the functions to hold the preceding rolled steel 1 and following rolled steel 2 and fix the mutual position of both the materials to secure a specified gap g between both the end faces. They can also function to apply a pressure to both the end faces by moving the rolled steel pieces 1 and 2 mutually in such a direction to decrease the gap g.

Multiple fusing torches 6 are fixed on the frames 7 and 7a at a specified height over rolled steels 1 and 2 in the width direction with a specified interval, by torch brackets 8 and 8a, which are divided into two units in the width direction.

On the other hand, the frame 7 is connected to the crank shaft 10 through the connecting bar 9 and the crank shaft 10 is connected to the motor 12 while supported rotatably by the bearing 11. When the motor 12 rotates, the frame 7 is reciprocated by the crank shaft 10 in the lateral direction and accordingly, the multiple fusing torches 6 mounted on the torch bracket 8 also reciprocate. Another frame 7a is connected to the crank shaft 10a through a connecting bar 9a and a crank shaft 10a is connected to a motor 12a while supported by a bearing 11a rotatably. When the motor 12a rotates, the frame 7a reciprocates via the crank shaft 10a and accordingly, multiple fusing torches mounted on the torch bracket 8a reciprocate. The motors 12 and 12a are controlled by a microprocessor controller 37.

Each fusing torch 6 is connected to the oxygen cylinder 15 and acetylene cylinder 16 via the hoses 13 and 14, and oxygen and acetylene gas are supplied from these cylinders. Each fusing torch 6 is provided with a fine iron powder supply pipe 19 and this supply pipe 19 is connected to the powder supply unit 22 containing fine iron powder and air or nitrogen cylinder 23 via the hose 20. By feeding air and nitrogen gas from the cylinder 23, fine iron powder 21 is supplied to the fusing torch 6 which produces a flame 24.

Such torches are used in our earlier co-pending application. The flame needs an oxygen surround to reach the required temperature. Consequently they cannot conveniently be closer than about 30 mm. The usual "pitch" is about 35 mm. For simplicity, only a few are shown. In reality several tens might be present.

The pinch rollers 4 and 5 are connected to individual motors (not shown) and driven independently. Because the pinch rollers 4 and 5 support rolled steels 1 and 2 only when they are jointed together and are kept open at other times, the pinch rollers 4 and 5 are supported by respective actuating cylinders (not shown) by which they can be lifted up and down.

Figure 4:
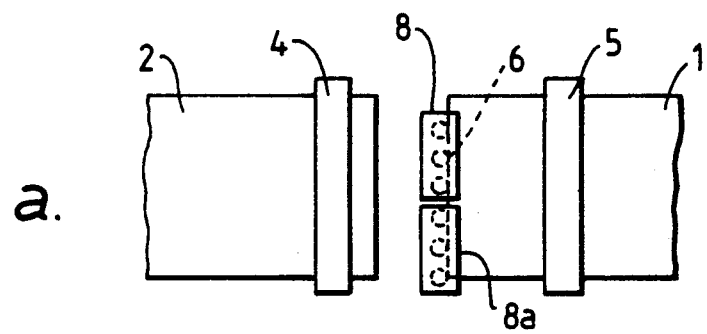
FIGS. 4a–4d illustrate, in plan view, stages of a joining method embodying the invention.
Figure 4:
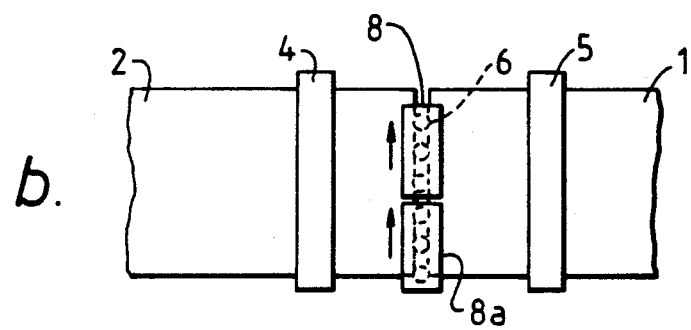
Figure 4:
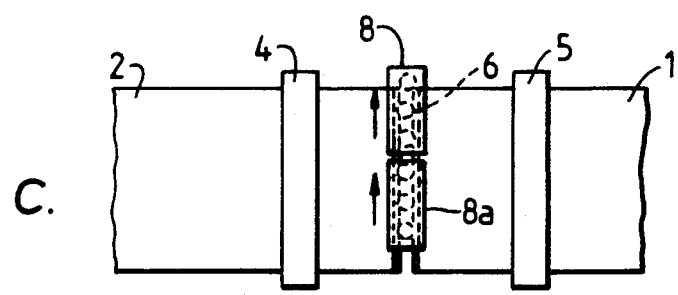
Figure 4:
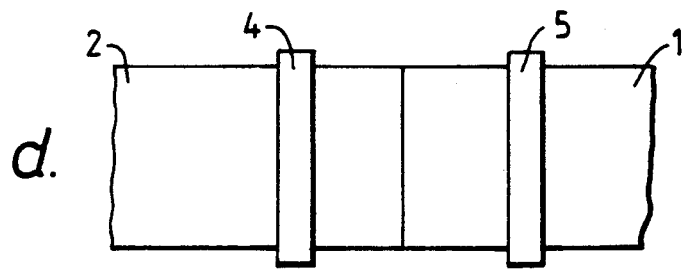

An embodiment of a joining method using the above mentioned joining apparatus is explained according to FIG. 4.

As shown in FIG. 4 (a), a preceding rolled steel piece 1 is held firmly by the pinch rollers and a following rolled steel piece 2 is transferred by the table roller 3 (See FIG. 1). After the following rolled steel piece 2 passes the pinch roller 4, it is moved further while supported by the pinch rollers 5 so as to bring the end of the following rolled steel piece towards the rear end of the preceding rolled steel, located at a fixing position. Then, the gap "g" between the rear end of the preceding rolled steel piece and the front end of the following rolled steel piece is set to a specified distance, the following rolled steel piece is stopped and then both the rolled steel pieces are held by the pinch rollers 4 and 5.

Then, the relationship between the side edge of each rolled steel 1,2 and fusing torch passing start positions is matched to a specified relationship. This is done by driving the motors 12a and 12 independently, under control of the preprogrammed controller 37 (see FIG. 1) and adjusting the distance between the torch brackets 8 and 8a depending on the width of the rolled steel piece 1 and 2. The purpose of this operation is to adjust the passage time between fusing by the fusing torch 6 at the edges of both rolled steel pieces to pressing by the pinch rollers 4 and 5 so as not to exceed the limit time of oxide scale regrowth with the relationship between the side edge of the rolled steel pieces and the position where passing of the fusing torch 6 terminates set at a desired condition.

Next, injection flow of cutting gas or fine iron powder is blown against the steel pieces by multiple fusing torches 6 located on the torch brackets 8 and 8a. At the same time, the torch brackets 8 and 8a supporting the multiple torches 6 are moved at the same speed (typically 5 to 15 mm/s) from the condition shown in FIG. 4 (b) to the condition shown in FIG. 4 (c). By this time, the shaded portion shown in FIG. 4 (c) has been fused along the overall thickness of the rolled steel, forming faces which can be joined together. When fusing is completed, the pinch rollers 4 and 5 holding the rolled steels 1 and 2 are rotated in the directions indicated by arrows. Consequently, the rolled steel pieces 1 and 2 are driven in such a direction that they come near and then the faces to be joined are pressed as shown in FIG. 4 (d) so that both the pieces are jointed together.

Figure 5:
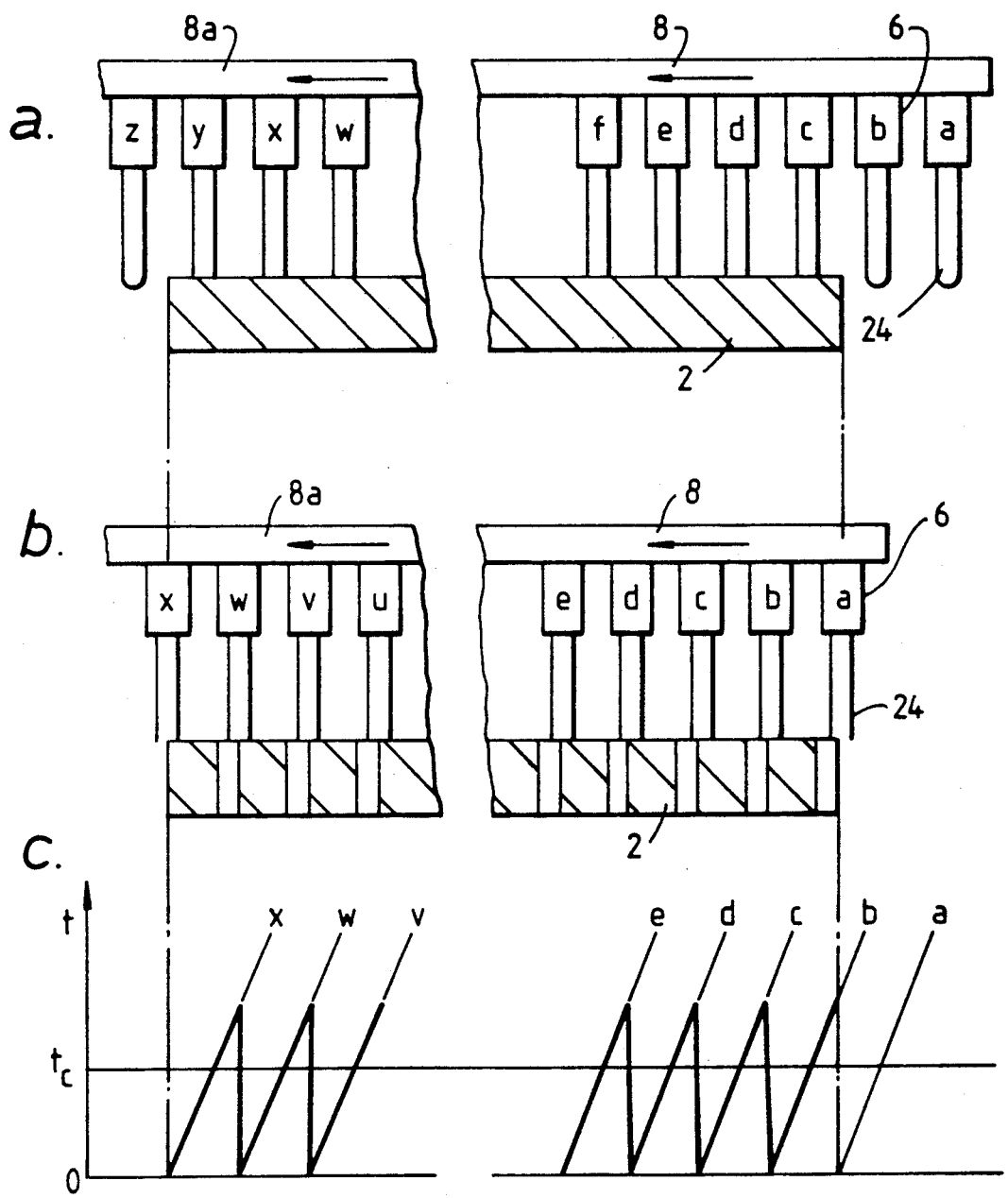
FIGS. 5a–5c are schematic sectional views at a joint, showing how poor joining may arise.
Figure 6:
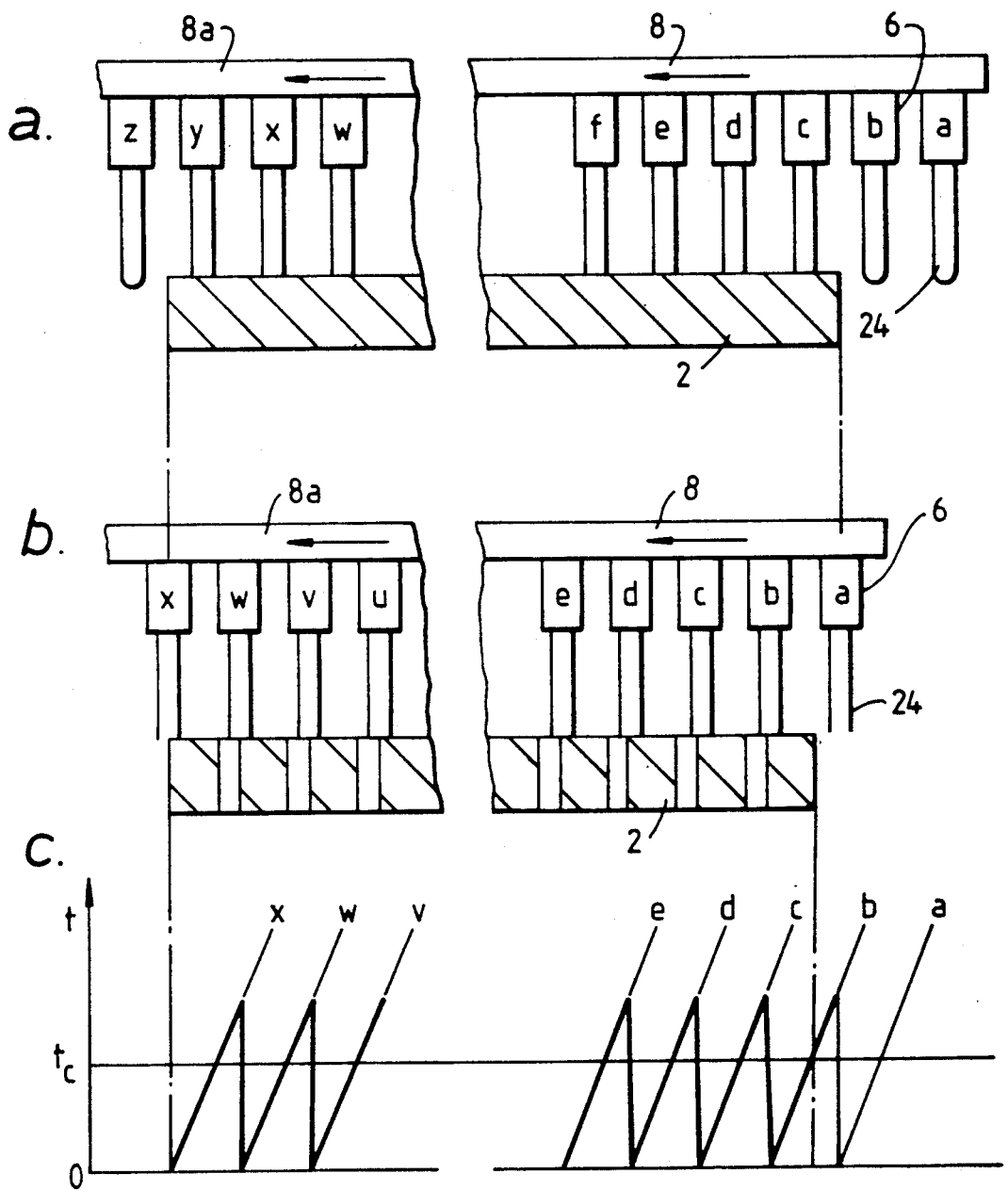
FIGS. 6a–6c are views corresponding to FIG. 5, showing control of the process to achieve a good joint.

The principle underlying the joining method of this embodiment is explained in FIGS. 5 and 6. Because the joining method of this embodiment presses the steel pieces 1,2 together after the fusing torches 6 travel for a specified distance in the width direction, the passage time from fusing to pressing differs depending on a position in the width direction. FIG. 5 explains a example of passage time from fusing to pressing. In the condition in FIG. 5 (a), cutting gas is injected from multiple fusing torches marked with a / z to start fusing. The torch brackets 8 and 8a travel in the width direction and when they reach the position shown in FIG. 5 (b), the two pieces are pressed together. FIG. 5 (c) shows the elapsed time after passage of a torch 6, at each position in the width direction. Both the rolled steel pieces 1 and 2 are pressed after a passage time expressed by the line a / x inclined at a certain gradient determined by the torch passing speed. Although a following torch will fuse the sam place in all the strokes of the torch bracket, the passage time after fusing by the final torch is expressed by the bold line shown in FIG. 5 (c). We have found that, as the passage time from fusing to pressing extends, oxide scale is regenerated to make a joint incomplete. A certain limit time "tc" exists concerning the regrowth of oxide scale and that joint does not always become complete at a portion where the passage time exceeds this limit time. The portions where this limit time "tc" is exceeded are shown by blank (unhatched) parts in FIG. 5 (b).

We have also found that, although rolled steel pieces are not required to be joined together completely in the overall width in rolling at a hot finish mill, there may occur an opening at a joint following finish rolling because an incomplete joint part exists at the side edge of the rolled steel pieces (to the right in FIG. 5) so that stress is concentrated under tension between stands, thereby sometimes leading to a fracture. To prevent this phenomenon, in this embodiment, the torch brackets 8 and 8a, divided in the width direction are designed to pass laterally independently, and able to correspond to any normal variation of width of rolled pieces. The relationship between the edge locations of the rolled steel pieces 1,2 and the passing start positions of the fusing torch 6 is thereby adjusted to a condition as shown in FIG. 6 (a), while the relationship between the edges of the rolled steel pieces and the passage termination positions of the fusing torches 6 is adjusted to such a condition shown in FIG. 6 (b). For this adjustment, optimum passing start positions for the torch brackets 8 and 8a are calculated as shown in FIG. 6 (a) according to rolled steel pieces width information stored in the controller 37 and the motors 12/12a are driven according to the result. Consequently, as shown in FIG. 6 (c), the passage time from fusing to pressing at both the ends of the rolled steel pieces 2 is incorporated within the limit time "tc" so as to prevent the reduction of joint strength at the ends of the rolled steel joint due to regrowth of oxide scale.

A typical torch stroke is from 50 to 100 mm.

Because both the rear end of a leading rolled steel pieces and the front end of a following rolled steel are fused by injection flow from the fusing torches 6, substantially the entire end fused to an appropriate condition for joining together in a short time to obtain clean faces to be joined. A uniform, high precision joint can be achieved by a small pressing force to produce a high strength joint.

Because the passage time from fusing to pressing at both the edges of the rolled steel pieces 1 and 2 is adjusted not to exceed the limit time of oxide scale regrowth time "tc" when passing multiple fusing torches laterally, regrowth of oxide scale at the end edge of the rolled steel pieces after fusion is restrained to such an extent to make no influence upon joining together, so that a joint at the end becomes excellent to intensify joint strength. In this way we have been able to avoid rupture of joints of rolled steel pieces in following finish rolling, so that stabilized continuous rolling is enabled and yield rate is improved. We were able in trials to make a good quality rolled steel.

Figure 7:
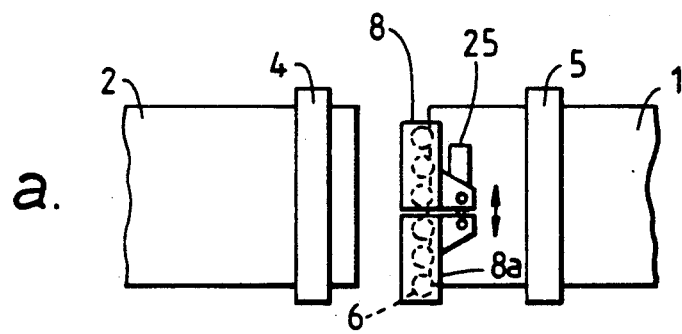
FIGS. 7a–7d show, in plan view, stages of a further joining process embodying the invention.
Figure 7:
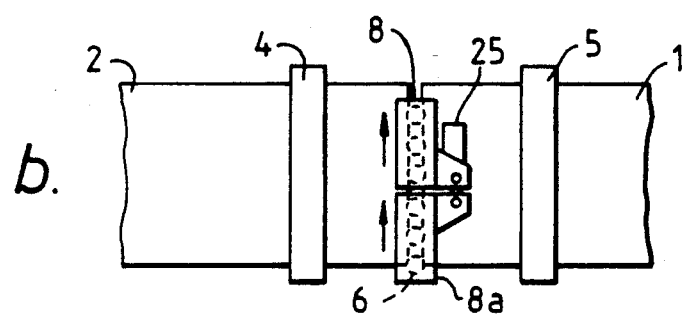
Figure 7:
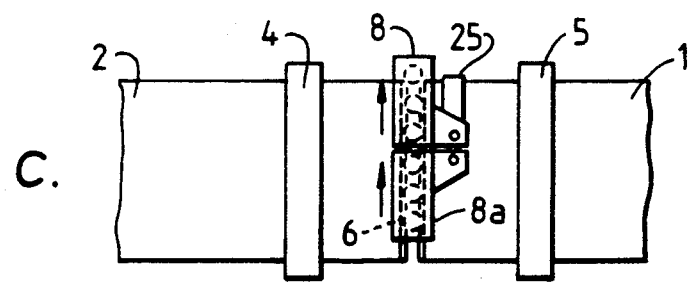
Figure 7:
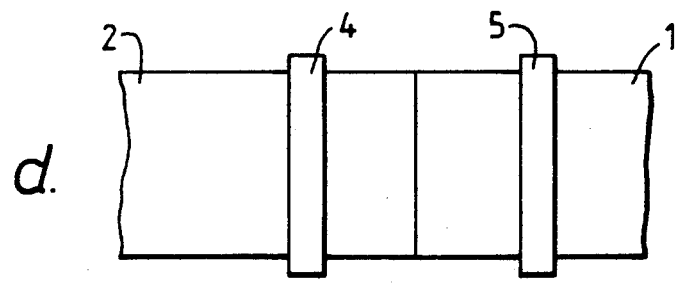

A further embodiment of the joining apparatus of this invention is explained with reference to FIG. 7. In this embodiment, as the previous embodiment, an adjustable cylinder 25 is provided to adjust the distance between two torch brackets 8 and 8a instead of moving the torch brackets 8 and 8a independently in their fusing stroke. With the distance between the two torch brackets 8 and 8a initially determined by the cylinder, the combined torch brackets are then moved so as to take the same procedure as the previous embodiment in fusing, pressing and jointing together.

This embodiment has an advantage in that only a pair of drive mechanisms for moving the combined torch brackets, including the crank shafts 10/10a, bearings 11/11a and motors 12/12a can satisfy the requirement for moving the system.

Figure 8:
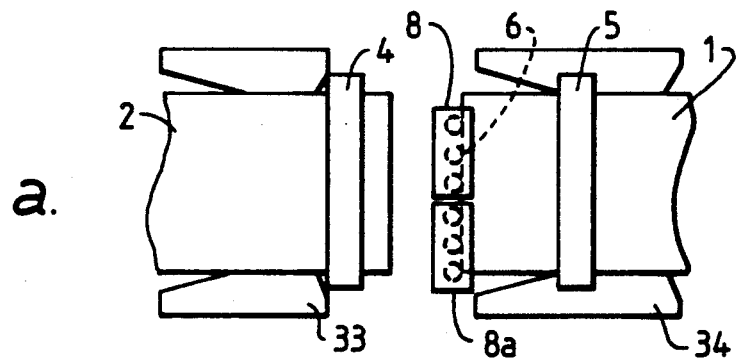
FIGS. 8a–8d show, in plan view, stages of a further joining process embodying the invention.
Figure 8:
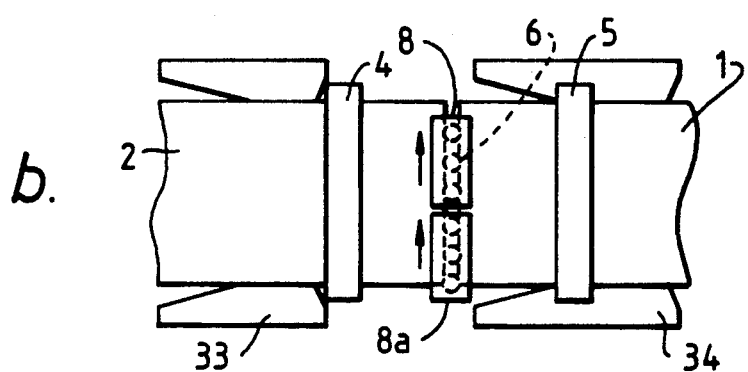
Figure 8:
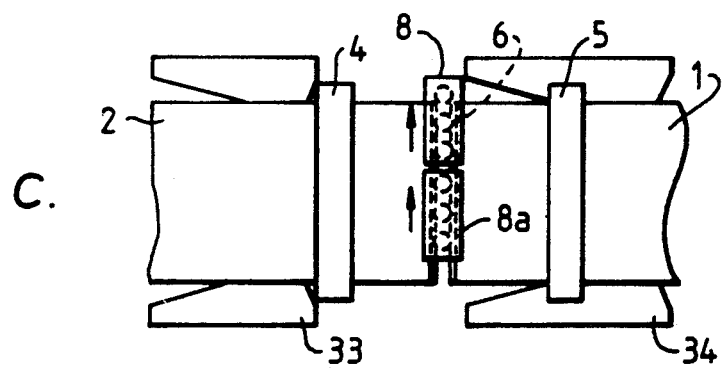
Figure 8:
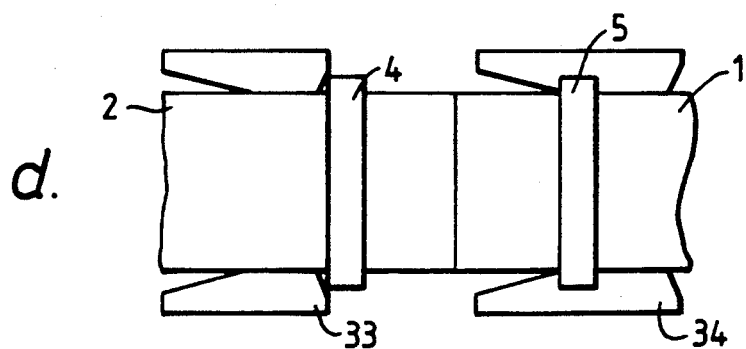

Referring to FIG. 8, still another embodiment of this invention is explained. In this embodiment, side guides 33,34 for guiding a preceding steel piece 1 and following steel piece 2 are installed in addition to the configuration of the embodiment shown in FIG. 1. They center the preceding and following steel pieces 1 and 2 so as to determine the relationship between the positions of the torch brackets 8,8a at the start of their fusing strokes and the side edges of the rolled steel piece. The steps for joining together shown in FIG. 8 (a) / (b) are the same as FIG. 4.

If either rolled steel piece 1 or 2 deviates from the center of the path in the width direction, an optimum passing start position as explained in FIG. 6 can be set by centering the steel pieces by means of the side guides 33 and 34.

Figure 9:
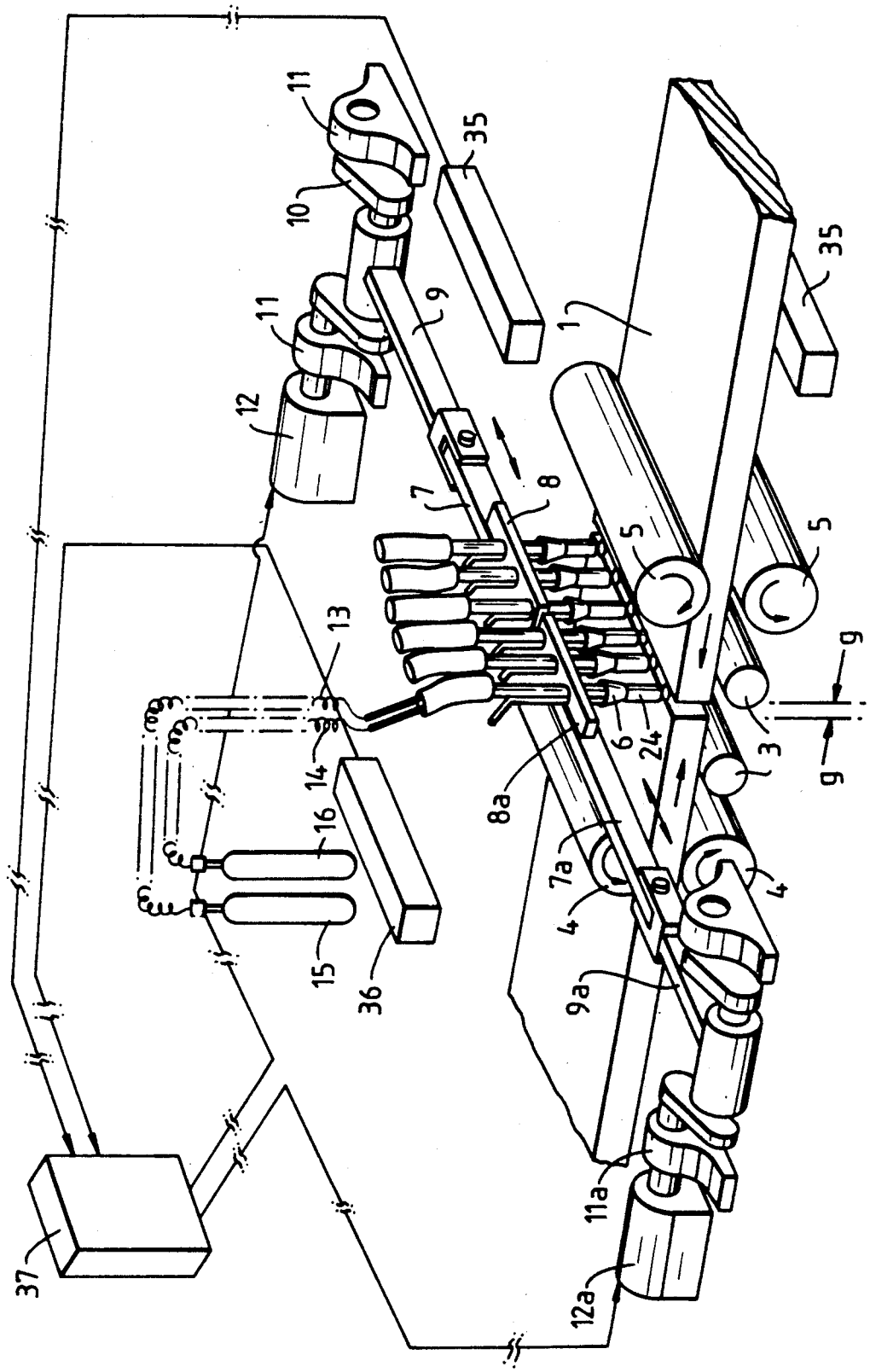
FIG. 9 is a schematic perspective view similar to FIG. 1, showing a further embodiment of apparatus.
Figure 10:
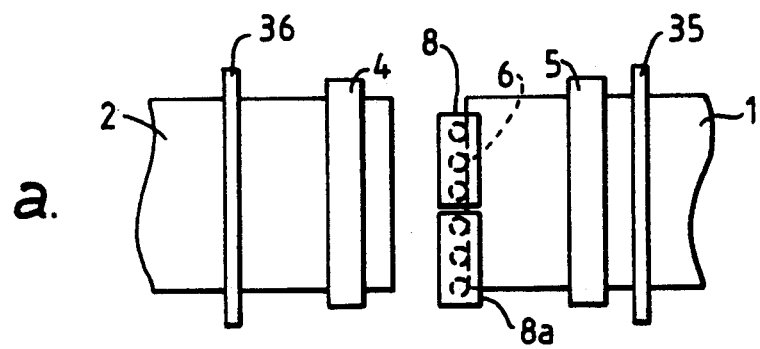
FIGS. 10a–10d show, in plan view, stages of a further joining process embodying the invention.
Figure 10:
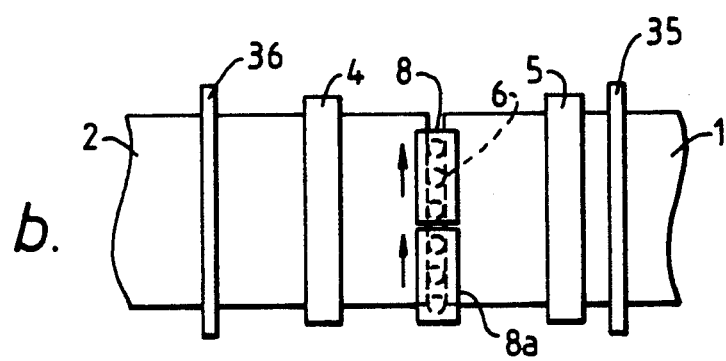
Figure 10:
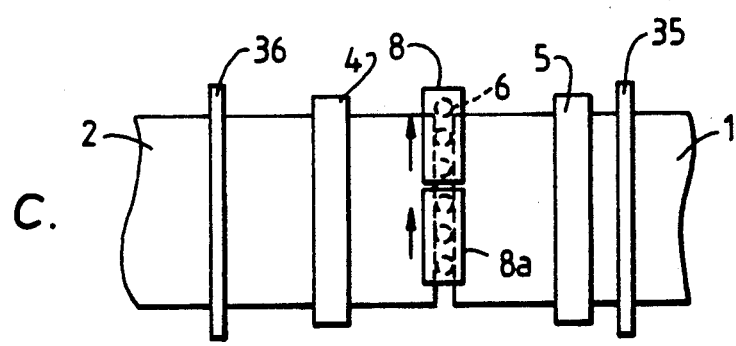
Figure 10:
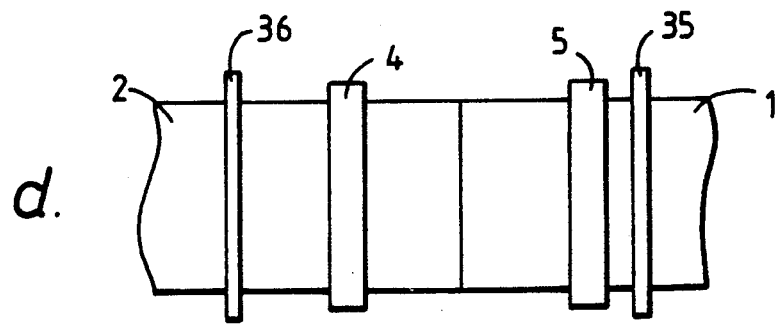

A further embodiment of the joint apparatus of this invention is explained referring to FIGS. 9 and 10. In this embodiment, in addition to the configuration of the embodiment shown in FIG. 1, position detectors 35,36 for detecting the lateral positions of a preceding steel pieces 1 and following steel pieces 2 are mounted across the processing path upstream and downstream of the fusing torches 6. They are connected to the controller 37 which receives their detection signals. Suitable detectors are known per se for use in rolling mills. A common type has an elongate light emitter on one face of the path, opposing a series of detectors over the other face. The controller 37 calculates optimum passing start positions of the torch brackets 8 and 8a according to the position information of rolled steel pieces detected by the position detectors 35,36, and controls the motors 12 and 12a accordingly. Consequently when the widths of the rolled steel pieces 1 and 2 change, as well as when they deviate from the center of the path in their width direction, the controller can automatically adjust the passing start positions of the torch brackets 8 and 8a so as still to determine an optimum position such as shown in FIG. 6. The steps for joining together (a) (d) shown in FIG. 10 are the same as FIG. 4.

Figure 11:
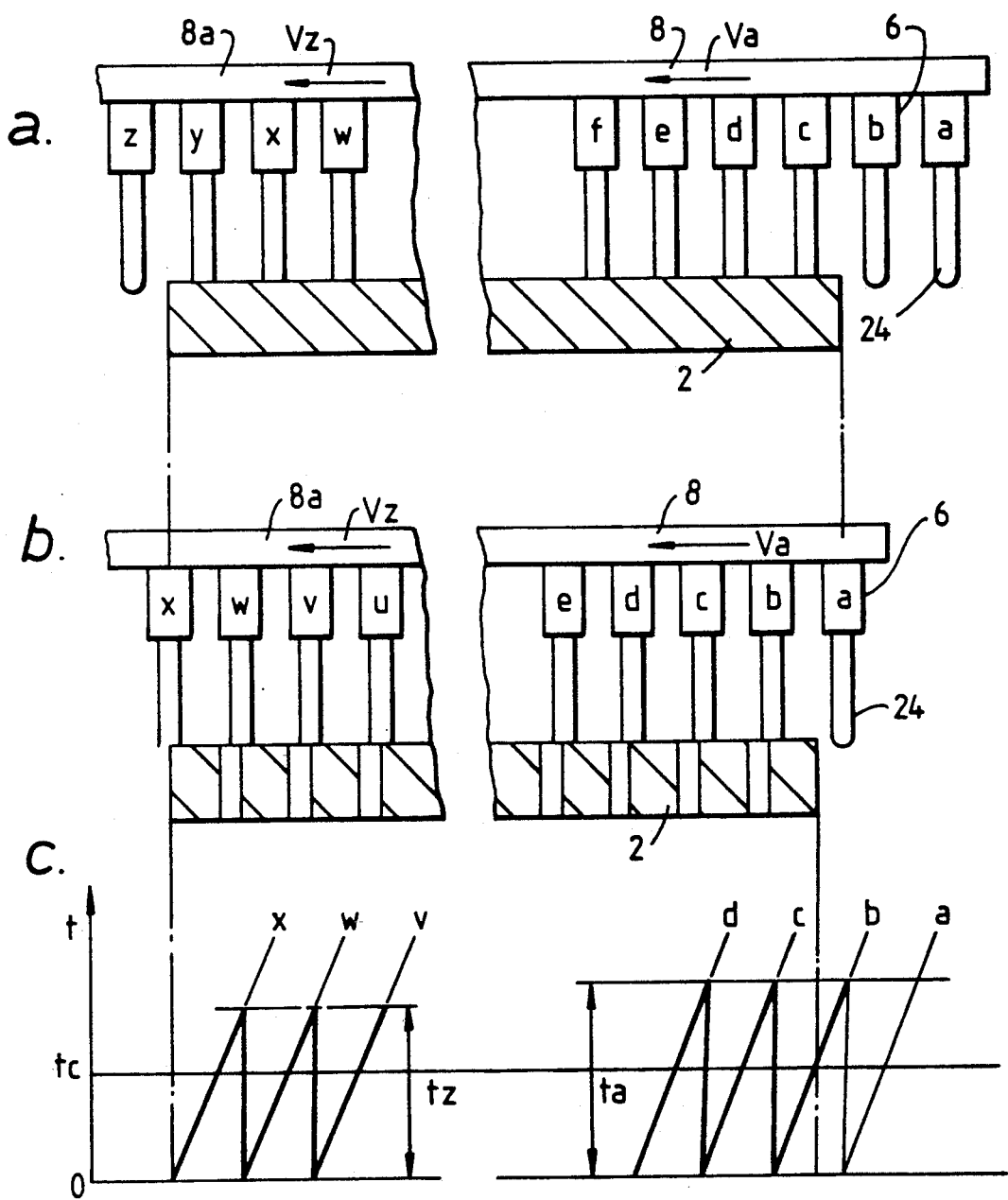
FIGS. 11a–11c are schematic sectional view at a joint, illustrating a further process embodiment.

A still further embodiment of this invention is explained referring to FIGS. 9 and 11. In previous embodiments the passing start positions of the torch brackets 8 and 8a are adjusted so that the passage time from fusing to pressing does not exceed the limit time "tc" regardless of th width and position of the rolled steels 1,2. In this embodiment, the passing start positions of the torch brackets 8 and 8a are not adjusted, but instead, the respective passing speeds Va and Vz of the torch brackets 8 and 8a are adjusted so that the passing termination position becomes an optimum position for joining together. Namely, although the passing start positions in FIG. 11 (a) are the same as FIG. 5 (a), the passing termination position in FIG. 11 (b) is the same as FIG. 6 (b), and as expressed by $t_a$ and $t_z$ in FIG. 11, the passing speed Va of the torch bracket 8 is made slower than the passing speed Vz of the torch bracket 8a just before the passing termination position at latest, to deviate the termination position. In this adjustment, the controller 37 calculates the passing speed Vz according to the position information of the rolled steels detected by the position detectors 35 and 36 so as to obtain optimum passing termination positions of the torch brackets 8 and 8a and control the motors 12 and 12a.

This embodiment has an effect of reducing the overall cycle time because the adjustment of the passing start positions of the torch brackets 8 and 8a before start of fusing can be omitted.

Although the invention has been described and illustrated in detail, it is to be clearly understood that the same is by way of illustration and example, and is not to be taken by way of limitation. The spirit and scope of the present invention are to be limited only by the terms of the appended claims.

We claim:

1. A method for joining consecutive pieces of steel in a hot rolling mill, comprising
   conveying the pieces of steel longitudinally along a processing path of the hot rolling mill; positioning a rear end edge of a first, leading piece of steel adjacent a front end of a second, following piece of steel to be joined thereto;
   determining lateral location of side edges of the pieces;
   passing multiple fusing torches laterally relative to the processing path along said end edges, in a fusing movement controlled on the basis of said determined side edge locations, causing fusing at at least one of said end edges, and
   urging the first and second pieces of steel together longitudinally to join them;
   said fusing movement of the fusing torches being controlled to keep the time between fusing of steel at lateral extremities of the joint, and urging together of said pieces to form the joint, less than a predetermined limit time for regrowth of oxide scale.

2. A method as claimed in claim 1 in which said multiple fusing torches comprise plural sets of such torches, each set including at least one torch, for fusing at said lateral extremities of the joint, and said fusing movement comprises at least partially independent movement of respective ones of said plural sets.

3. A method as claimed in claim 2 in which said controlling of said fusing movements comprises selecting independent respective starting positions for the fusing movements of said respective sets.

4. A method as claimed in claim 3, comprising moving said sets concurrently in the same lateral direction during their fusing movement.

5. A method as claimed in claim 2, in which said controlling of said fusing movement comprises selecting independent respective speeds for the fusing movements of said respective sets.

6. A method as claimed in claim 5, comprising moving said respective sets concurrently in the same lateral direction during their fusing movement.

7. A method as claimed in claim 2 in which said controlling of said fusing movement comprises selecting independent respective termination positions for the fusing movements of said respective sets.

8. A method as claimed in claim 1, in which said step of determining side edge locations comprises detecting positions of said edges of the steel pieces adjacent their end edges, using position detectors extending across the processing path.

9. A method as claimed in claim 1, comprising contacting the steel pieces against side guides positioned at the sides of the processing path, to determine the lateral location of the pieces.

10. A method of joining pieces of steel in a hot rolling mill, comprising
    positioning a rear end edge of a first, leading piece of steel adjacent a front end edge of a second, following piece of steel to be joined thereto, adjacent at least two laterally-extending sets of fusing torches;
    independently selecting respective start positions for each of two of said sets of fusing torches, relative to the lateral locations of respective lateral edges of the steel pieces;
    moving said two sets of fusing torches to their respective starting positions;
    moving the sets of fusing torches laterally in a fusing movement, to cause fusing along at least one of said end edges of the steel pieces, with said two sets of torches moving in the same lateral direction, and
    pressing the first and second pieces together longitudinally, to join them at least at the lateral extremities of their meeting end edges.

11. A method of joining consecutive pieces of steel in a hot rolling mill, comprising
    positioning a rear end edge of a first, leading piece of steel adjacent a front end edge of a second, following piece of steel, adjacent at least two laterally-disposed sets of fusing torches;
    independently selecting a respective traversing speed for each of two of said sets of fusing torches, relative to determined lateral locations of respective lateral edges of the steel pieces;
    moving the sets of fusing torches laterally in a fusing movement, with said two sets moving at their respective selected traversing speeds, to cause fusing along at least one of the adjacent end edges of the first and second steel pieces, and
    pressing the first and second steel pieces together longitudinally to join them at least at the lateral extremities of the meeting of their end edges.

12. A method of processing steel in a hot rolling mill, comprising:
    forming steel pieces;
    joining successive said steel pieces by a method comprising the steps of conveying the pieces of steel longitudinally along a processing path of the hot rolling mill; positioning a rear end edge of a first, leading piece of steel adjacent a front end of a second, following piece of steel to be joined thereto;
    determining lateral location of side edges of the pieces;
    passing multiple fusing torches laterally relative to the processing path along said end edges, in a fusing movement controlled on the basis of said determined side edge locations, causing fusing at at least one of said end edges, urging the first and second pieces of steel together longitudinally to join them;

said fusing movement of the fusing torches being controlled to keep the time between fusing of steel at lateral extremities of the joint, and urging together of said pieces to form the joint less than a predetermined limit time for regrowth of oxide scale;

rough rolling the joined pieces, and finish rolling the rough-rolled joined pieces.

13. A method as claimed in claim 12, further comprising cooling, shearing and winding the finish-rolled steel.

14. A method of processing steel in a hot rolling mill, comprising:

forming steel pieces;

rough rolling the steel pieces;

joining consecutive rough-rolled steel pieces by a method of conveying the pieces of steel longitudinally along a processing path of the hot rolling mill; positioning a rear end edge of a first, leading piece of steel adjacent a front end of a second, following piece of steel to be joined thereto;

determining lateral location of side edges of the pieces;

passing multiple fusing torches laterally relative to the processing path along said end edges, in a fusing movement controlled on the basis of said determined side edge locations, causing fusing at at least one of said end edges, urging the first and second pieces of steel together longitudinally to join them;

said fusing movement of the fusing torches being controlled to keep the time between fusing of steel at lateral extremities of the joint, and urging together of said pieces to form the joint less then a predetermined limit time for regrowth of oxide scale; and finish rolling the joined rough-rolled pieces.

15. A method as claimed in claim 14, further comprising cooling, shearing and winding the steel.

16. Apparatus for joining consecutive pieces of steel in a hot rolling mill, in which steel pieces are conveyed longitudinally along a processing path, the apparatus comprising:

multiple fusing torches disposed laterally across the processing path;

means for driving said fusing torches laterally in a fusing movement, to fuse end edges of steel pieces on the processing path in operation;

means for determining the locations of side edges of steel pieces on the processing path;

control means, said control means being connected to said driving means and said side edge location determining means, and adapted to control the driving means to effect independent adjustment of the respective said fusing movements made by various of said fusing torches which operate a the side edges of the processing path, and means for pressing consecutive steel pieces on the processing path longitudinally together to join them.

17. Apparatu for joining consecutive pieces of steel in a hot rolling mill, in which steel pieces are conveyed longitudinally along a processing path, the apparatus comprising first and second torch sets, each said torch set comprising at least one fusing torch, disposed laterally across said processing path for fusing at least respective lateral edge portions of steel pieces thereon in operation;

an adjustable connector, said adjustable connector linking the first and second torch sets;

means for adjusting the length of said adjustable connector to alter the distance between said torch sets, and means for moving the connected torch sets together in the same direction in a lateral fusing movement.

18. Apparatus for joining consecutive pieces of steel in a hot rolling mill, wherein steel pieces are conveyed longitudinally along a processing path, the apparatus comprising first and second torch sets, each said torch set comprising at least one fusing torch, disposed laterally across said processing path for fusing at least respective lateral edge portions of steel pieces thereon in use;

first drive means for driving said first torch set, and second drive means for driving said second torch set independently of said first torch set, and means for independently selecting respective driving speeds for said first and second drive means to effect respective lateral fusing movements of said first and second torch sets.

19. Apparatus as claimed in claim 16, further comprising side guides disposed laterally in relation to the processing path, said side guides being adapted to determine the width centers of successive steel pieces being conveyed along the processing path in operation.

20. Apparatus as claimed in claim 16, further comprising position detection means for detecting the lateral locations of steel pieces on the processing path in operation.

21. A hot rolling mill comprising joining apparatus as claimed in claim 16.

22. A hot rolling mill comprising joining apparatus as claimed in claim 17.

23. A hot rolling mill comprising joining apparatus as claimed in claim 18.

24. A hot rolling mill as claimed in claim 21, comprising a heating furnace and a rough rolling stage, said joining apparatus being positioned between said heating furnace and said rough rolling stage.

25. A hot rolling mill as claimed in claim 21 comprising a rough rolling stage and a finish rolling stage, said joining apparatus being positioned between said rough rolling stage and said finish rolling stage.

* * * * *